United States Patent
Mäder et al.

(10) Patent No.: US 6,269,942 B1
(45) Date of Patent: Aug. 7, 2001

(54) FORCE TRANSMISSION OR TRANSPORT DEVICE

(75) Inventors: Carl Conrad Mäder, Hinwil; Marcel Schneider, Auslikon, both of (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/502,739

(22) Filed: Feb. 11, 2000

(30) Foreign Application Priority Data

Feb. 16, 1999 (CH) .................................................... 290/99

(51) Int. Cl.[7] .................................................. B65G 35/08
(52) U.S. Cl. .................................... 198/795; 198/867.13
(58) Field of Search .............................. 198/795, 343.1, 198/867.13, 580

(56) References Cited

U.S. PATENT DOCUMENTS

| | | | |
|---|---|---|---|
| 2,519,179 | * 8/1950 | Duncan | 198/795 X |
| 3,059,489 | 10/1962 | Gourley | |
| 4,072,228 | 2/1978 | Honegger et al. | |
| 4,080,841 | 3/1978 | Vollers | |
| 5,503,264 | 4/1996 | Eberle | |
| 6,019,214 | * 2/2000 | Herronen et al. | 198/343.1 X |
| 6,155,405 | * 12/2000 | Siebenmann et al. | 198/795 |

FOREIGN PATENT DOCUMENTS

| | | |
|---|---|---|
| 0 309 702 | 4/1989 | (EP) . |
| 2 228 910 | 4/1989 | (GB) . |
| WO 97/15514 | 5/1997 | (WO) . |

* cited by examiner

*Primary Examiner*—James R. Bidwell
(74) *Attorney, Agent, or Firm*—Rankin, Hill, Porter & Clark LLP

(57) ABSTRACT

A force transmission or transport device having a line of force transmitting elements (2), a guide (1) for guiding the line of force transmitting elements (2) along a predetermined course, and at least one drive. A tensioning drive (6) is provided at one end of a section (5) of the predetermined course. A further drive (3), or an intermitting stop (9), is provided at the other end of the section (5) for tensioning the line of force transmitting elements (2) by a tractive or a compressive load. The further drive (3) or stop (9) acts substantially without slippage on the force transmitting elements (2). The tensioning drive (6), via a friction clutch, starts slipping when the desired tension has built up.

15 Claims, 6 Drawing Sheets

FORCE TRANSMISSION OR TRANSPORT DEVICE

BACKGROUND OF THE INVENTION

The present invention concerns a force transmission or transport device. As force transmission means, the device comprises a line of force transmitting elements, guide means for guiding the force transmitting elements along a redetermined course and at least one drive, whereby the drive acts upon force transmitting elements locally and displaces these in the area of the drive along the predetermined course and whereby the driven elements displace further elements in the line by pushing or pulling them.

The force transmitting elements may be connected to each other forming a chain, the connections between the elements having more or less clearance. Connected force transmitting elements can act on each other in a pulling manner, or if they have a suitable form and suitable guide means are provided, also in a pushing manner. On the other hand, the force transmitting elements may be unconnected. For unconnected force transmitting elements, it is necessary to provide guide means along the whole course (e.g. guiding channel or rails) and force transmission is only possible by means of pushing.

For transport purposes, the force transmission elements are at least partly equipped with transport means or can be coupled to such means. The transport means are e.g. grippers for gripping individual objects, loading platforms, or loading containers displaceable along the predetermined course.

Suitable drives for force transmission means as described above are, for example, sprockets meshing with the force transmitting elements or between the force transmitting elements (positive engagement) and driving these along a mostly circular section of the course.

If the force transmission means of a force transmission or transport device of the kind described above comprises mutually connected elements, with non-negligible clearance between the elements or if the force transmission means comprises unconnected elements, the distances between the elements are dependent on the load. On loaded sections of the course (e.g. between a drive and a power take-off) lines of pulled elements have the relatively largest distances between each other while lines of pushed elements have the relatively smallest distances between each other. On sections of the course where there is no load, the distances between the elements are not precisely defined and are possibly dependent on changing outer or external circumstances.

For preventing such undefined distances between force transmitting elements, force transmission means that are closed in themselves are tensioned. For example, tensioning of chains, chain adjusters, can be done with passively rotating sprung sprockets or chain channels that are elastically deformable in a longitudinal direction and designed to be slightly longer than the chain running inside them.

This kind of pre-tension between force transmission means (chain) and guide means (chain adjusters or longitudinally elastic channel) is possible only for a force transmission means which extends substantially without gaps over a predetermined course being closed in itself. It is not applicable for a force transmission means with two ends that are moved to and fro on a predetermined course. It is not applicable for a line of unconnected force transmitting elements that are displaced along a predetermined course in varying numbers. It is also not applicable for a local pre-tension of the force transmission means.

SUMMARY OF THE INVENTION

An object of the invention is a force transmission or transport device comprising a line of mutually connected or unconnected force transmitting elements serving as force transmission means, at least one drive acting locally on force transmitting elements, and guide means for guiding the force transmitting elements on a predetermined course. The present invention makes it possible to tension the line of force transmitting elements on at least one section of the predetermined course and, thus, to set precisely defined element distances on this section of the course. In particular, this selected tensioning is possible independent of whether the elements are connected with each other, and independent of whether the predetermined course and/or the line of force transmitting elements is closed in itself.

In accordance with the present invention, the device comprises means for tensioning the line of force transmitting elements in a predetermined section of the predetermined course by means of tractive or compressive load such that connected elements are adjusted to have the largest possible distance between each other (tractive load) or that connected or unconnected elements are adjusted to have the smallest possible distance between each other (compressive load). on one end of the section of the predetermined course on which the line of force transmitting elements is to be tensioned, a tensioning drive acting on force transmitting elements via a friction clutch is provided. On the other end of the section a further drive or an intermitting stop is provided acting on the elements substantially without slippage.

The tensioning drive drives the elements at a speed Vs different from the driving speed V of the further drive or intermitting stop (V=0) such that elements are pulled away from the further drive or stop (tractive load) by the tensioning drive or are pushed towards it (compressive load). As soon as, between the tensioning drive and the further drive, the tractive or compressive effect of the tensioning drive has built up a sufficient load in the line of elements the friction clutch of the tensioning drive starts slipping. The maximum load for tensioning the force transmission means between the tensioning drive and the further drive or stop corresponds to the friction resistance of the friction clutch of the tensioning drive.

The further drive or stop acts on the force transmitting elements substantially without slippage, i.e., by positive engagement or friction engagement such that produces slipping of the further drive only occurs with considerably larger forces than slipping of the tensioning drive.

BRIEF DESCRIPTION OF THE DRAWINGS

The principle of the inventive device, exemplified embodiments of the inventive device as well as examples of applications for the inventive device are described in detail in connection with the following figures, wherein.

DETAILED DESCRIPTION OF THE PREFERRED EMBODIMENTS

Figure 1:
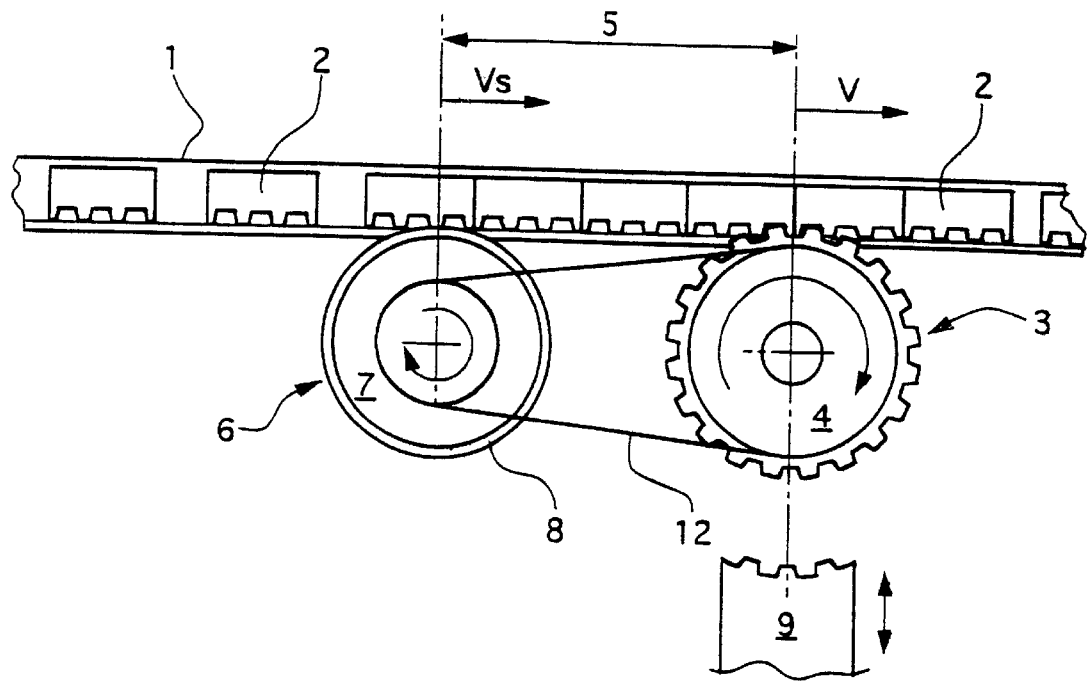
FIGS. 1 and 2 show the principle of the inventive force transmission or transport device comprising means for creating locally either a compressive load (FIG. 1) or a tractive load (FIG. 2) in the force transmission means.
Figure 2:
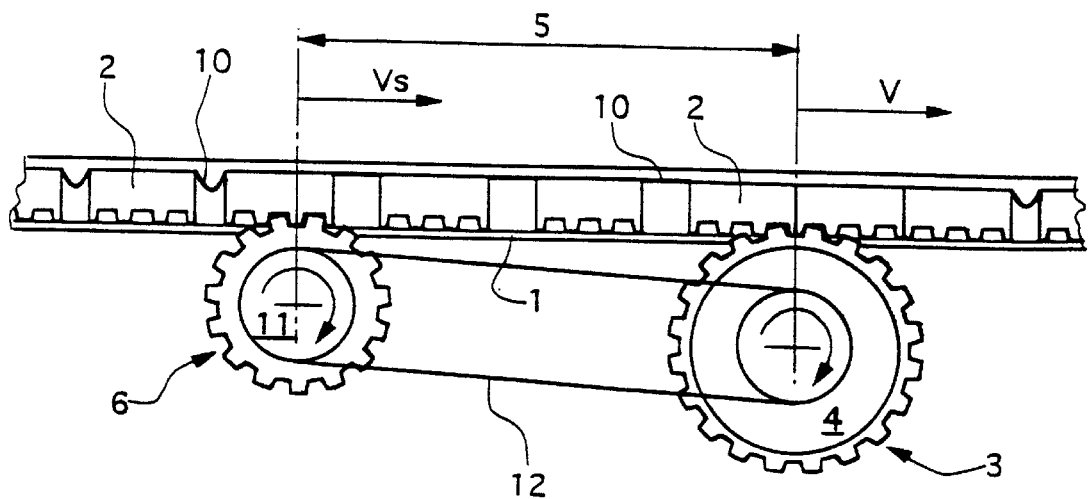

FIGS. 1 and 2 show very diagrammatically, the functional principle of the inventive device on parts of exemplified embodiments thereof FIG. 1 shows guide means 1 in form of a guide channel or of corresponding guide rails (shown diagrammatically by means of two lines). The guide means define a predetermined course along which a line of force transmitting elements 2 (not connected to each other in the shown case) can be displaced. The force transmitting elements 2 comprise, on one side, teeth with which a drive 3 in form of a sprocket wheel 4 meshes in a positively engaging manner for displacing the force transmitting elements 2 along the guide means 1 at a driving speed V. The drive 3 is at one end of a section 5 of the predetermined course on which the line of force transmitting elements 2 is to be subjected to a compressive load.

On the other end of section 5, a tensioning drive is provided. This drive comprises a tensioning wheel 7 carrying a circumferential ring 8 made of an elastically deformable material. The ring 8 is pressed against the force transmitting elements 2 by pressing means (not shown). The tensioning wheel 7 is driven via coupling means 12 (e.g. toothed belts) by drive 3 such that the driving speed Vs at which the force transmitting elements 2 are driven by the tensioning wheel 7 is larger than the driving speed V at which the force transmitting elements 2 are driven by drive 3 (a resulting relative speed Vs−V is directed from tensioning drive 6 into section 5).

Tensioning drive 6 creates and maintains a line of force transmitting elements 2 that are pressed against each other. In this line the distances between the elements are the smallest possible and they are defined exactly. The friction force between elements 2 and tensioning wheel 7 is adjusted such that the tensioning wheel 7 starts slipping on the elements 2 when in the line of elements 2 between drive 3 and tensioning drive 6, a desired load has built up.

It is not a condition that the tensioning drive 6 is driven by the further drive 3. Rather, the tensioning drive can also comprise its own motor.

The drive 3 may be a continuous drive (toothed wheel 4 rotating continuously) or displace the elements stepwise, i.e. drive and stop them alternately. The tensioning drive 6 is advantageously a continuous drive and in the case of a stepwise drive 3 not coupled to the latter.

Instead of drive 3, a stop 9 may be provided as shown below drive 3. Such a stop intermittently interacts with elements 2 either by positively engaging them or by being positioned between elements (driving speed of the stop: v=0). When stop 9 is active (stop interacting with elements 2) the line of elements 2 between stop 9 and tensioning drive 6 are tensioned by the tensioning drive 6. When stop 9 is inactive (stop not interacting with elements) elements 2 are displaced by tensioning drive 6.

In the section designated with 5 of the device according to FIG. 1, a compressive load and thus a defined distance between the elements is achieved. This will, for example, guarantee exact engagement between drive 3 and elements 2.

The device according to FIG. 1 can also be operated with the driving speed v having a direction opposed to the shown direction. For achieving a compressive load in the line of elements between drive 3 and tensioning drive 6 the driving speed Vs of the tensioning drive 6 is then to be smaller than V or is to be directed opposed to V (resulting speed: Vs−V is directed from tensioning drive 6 into section 5) such that the elements are decelerated by the tensioning drive.

FIG. 2, in a similar manner as FIG. 1, shows a force transmission or transport device in which the force 5 transmission means is subjected to a tractive load in a section 5, the elements 2 being connected with each other by connections 10. The tractive load, by means of which the force transmitting elements are adjusted to have maximum and precisely defined distances between each other, is achieved by 10 a tensioning drive 6 and a further drive 3. The driving speed Vs of tensioning drive 6 is smaller than the driving speed V of drive 3 or is directed in the opposite direction (resulting speed: Vs−V is directed from tensioning drive 6 away from section 5). In this case also, drive 3 can be replaced by an intermittent stop (V=0).

The device according to FIG. 2 can also be operated in the opposite direction (V directed towards the left), whereby the driving speed Vs must be larger than V (resulting speed: Vs−V is directed from the tensioning drive away from section 5).

Drive 3 of the device according to FIG. 2 is, like in FIG. 1, a sprocket wheel 4. The tensioning drive 6 also comprises a sprocket wheel 11 interacting with the line of elements 2 by positive engagement. The sprocket wheel 11 of the tensioning drive 6 is coupled to drive 3 via coupling means 12 in the form of a fiction clutch (e.g. belt coupling). The friction clutch is designed such that the clutch starts slipping when a desired tension has built up in the line of force transmitting elements.

Figure 3:
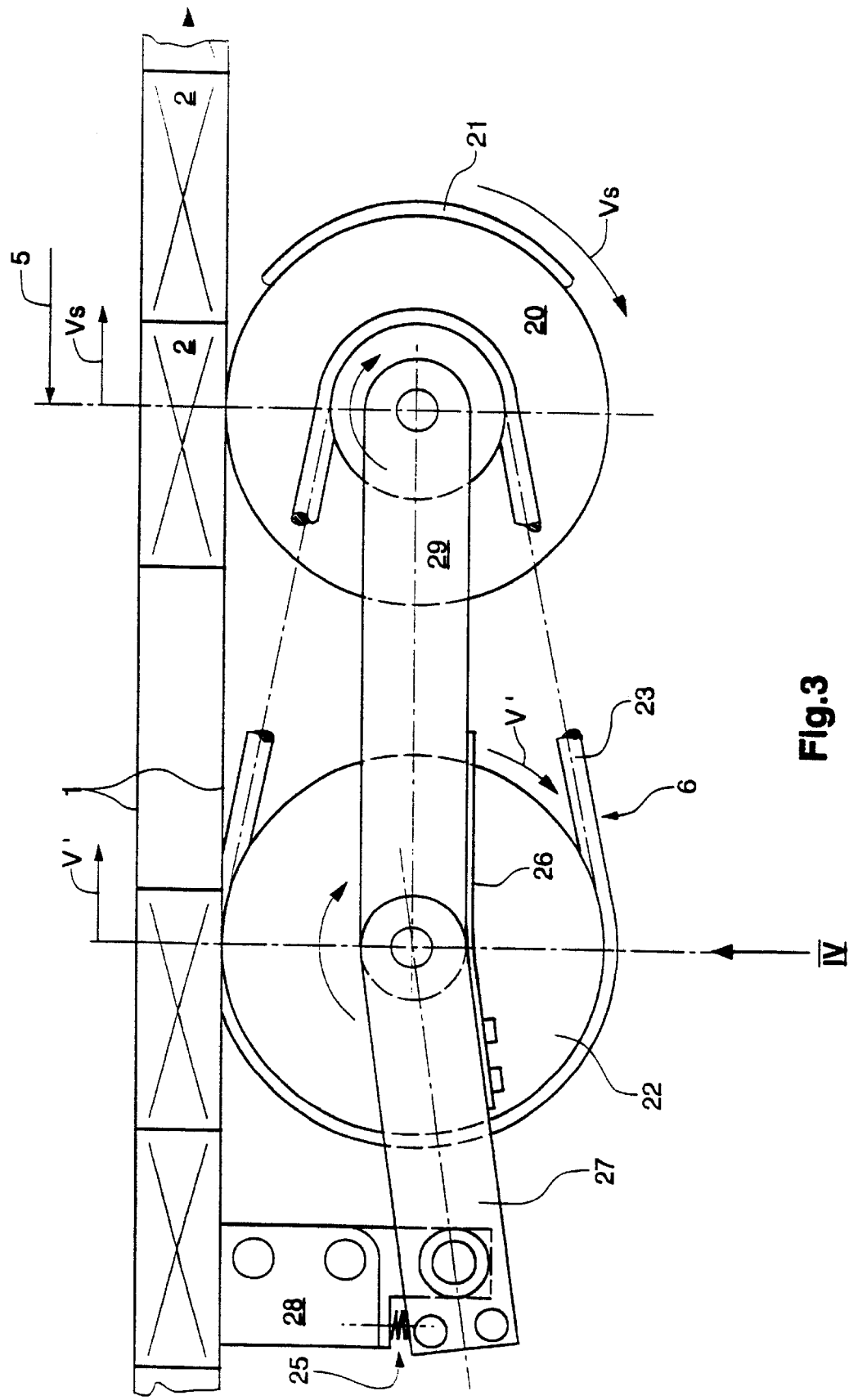
FIGS. 3 and 4 show an exemplified embodiment of a tensioning drive for the inventive device in a side view (FIG. 3) and in a top view (FIG. 4, seen in direction of arrow IV in FIG. 3)
Figure 4:
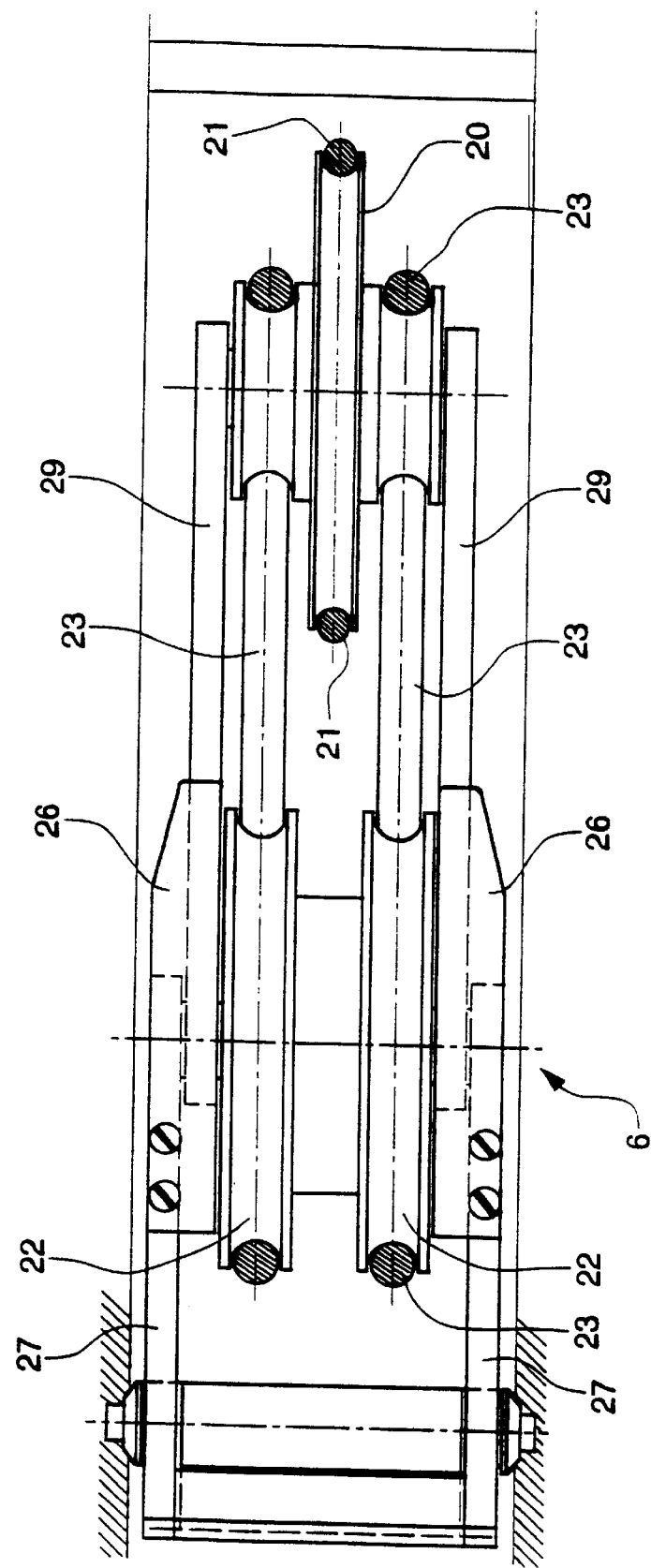

FIGS. 3 and 4 show an exemplified embodiment of a tensioning drive for an inventive force transmission or transport device in a side view (FIG. 3) and viewed from below (FIG. 4, angle of view according to arrow IV in FIG. 3). The tensioning drive 6 comprises a tensioning wheel 20 with an elastically deformable circumferential ring 21. The wheel 20 is functionally coupled by friction to the force transmitting elements 2. Section 5 in which the line of force transmitting elements is to be tensioned is situated on the right side of tensioning wheel 20. The tensioning wheel 20 is driven, via a drive belt, by a pair of driven wheels 22 that are functionally coupled to the force transmitting elements 2 by friction. The rings 23 on these driven wheels 22 are elastically deformable and simultaneously serve as belts coupling the driven wheels 22 and the tensioning wheel 20.

The belt coupling between the driven wheels 22 and tensioning wheel 20 is designed for the desired gear ratio between the tensioning wheel 20 and the driven wheels 22. In the present case, the driving speed Vs is larger than the driven speed V', which corresponds to the speed of a further drive (not shown) by which the elements 2 are pushed from the left towards the driven wheels 22.

In a tensioning drive according to FIG. 3, the friction force between the force transmitting elements 2 and the driven wheels 22 is to be larger than the fiction force between elements 2 and the tensioning wheel 20 (or possibly the friction force in the belt drive). This is achieved, for example, by providing a first spring means 25 for pressing the driven wheels 22 against force transmitting elements and a second spring means 26 for pressing tensioning wheel 20 against force transmitting elements 2.

The driven wheels 22 are arranged to freely rotate on first compression levers 27. The levers 27 are pivotally arranged on fixed supports 28 and are urged by the first spring means 25 towards the guide means 1 or towards force transmitting elements 2 guided in the guide means. In other words, the driven wheels 22 are pressed against the force transmitting elements 2 by the first compression levers 27 and are thus driven.

The tensioning wheel 20 is arranged to freely rotate on second compression levers 29. The second compression levers are fixed, via second spring means 26, to the first compression levers 27. The second spring means 26 press the second compression levers 29 and, thus, the tensioning wheel 20 against the force transmitting elements 2. The second spring means 26 is designed such that the resulting pressing force is smaller than the pressing force from the first spring means 25 acting on the driven wheels 22.

Figure 5:
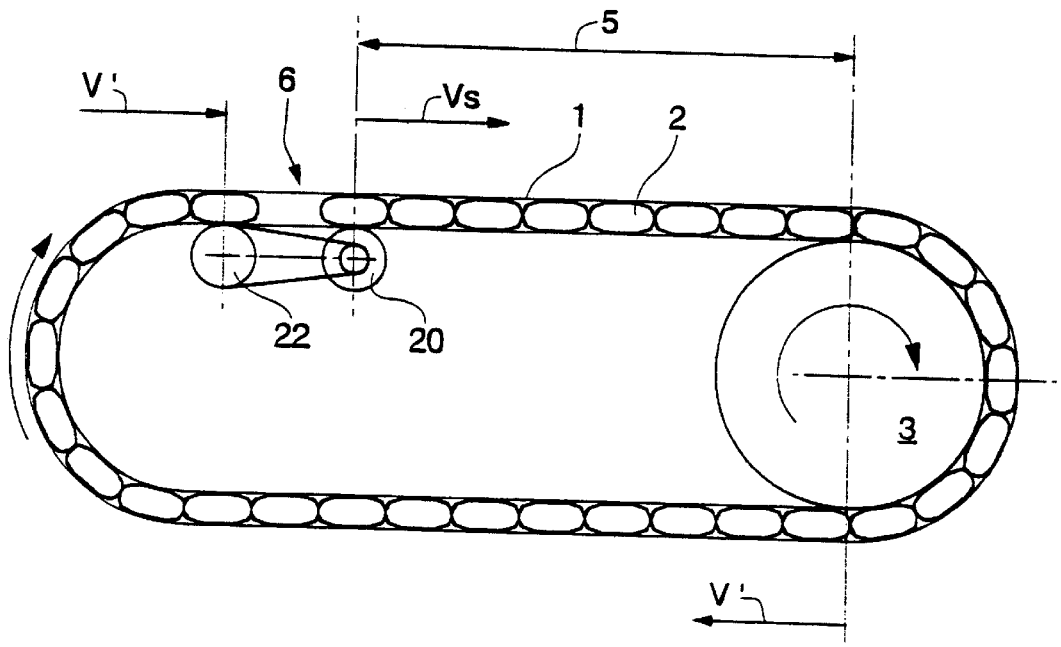
FIGS. 5 to 7 show three exemplified applications of the inventive device.

FIG. 5 shows an exemplified embodiment of an inventive device with a tensioning drive according to FIGS. 3 and 4. The guide means I of the device defines a course that is closed in itself (i.e., an endless loop). Along the course, e.g. unconnected force transmitting elements 2 are displaced in clockwise direction by a drive 3. The guide means 1 is slightly longer than the line of force transmitting elements 2. In order to still have exactly defined distances in the line of unconnected force transmitting elements on a majority of the course, the device additionally comprises a tensioning drive 6 of the kind described in connection with FIGS. 3 and 4 for creating a compressive load on the line.

The tensioning drive 6 comprises a driven wheel 22 and a tensioning wheel 20 driven by the driven wheel. The line of elements 2 is loaded by compression between drive 3 and tensioning wheel 20 (section 5). As in every system with a driven element 22 being functionally coupled with a drive 3 via a force transmission means, the force transmission means is loaded between the two. In the present case the loading is compressive and dependent on the deceleration of the elements by the driven element 22. This means nothing else than that on the whole closed course, the distances between the force transmitting elements 2 are the smallest possible ones except for the section between the driven wheel 22 and the tensioning wheel 20 of the tensioning drive 6, where the distances correspond to the total longitudinal clearance of the whole force transmitting means. For the system to work, the total clearance must be smaller than the distance between driven wheel 22 and tensioning wheel 20.

The compressive loading which can be created in the device according to FIG. 5 is, for example, very small and is dependent on the friction force between tensioning wheel 20 and force transmitting elements 2 for section 5 and dependent on the deceleration of elements 2 by the driven wheel 22 for the section between drive 3 and driven wheel 22.

Figure 6:
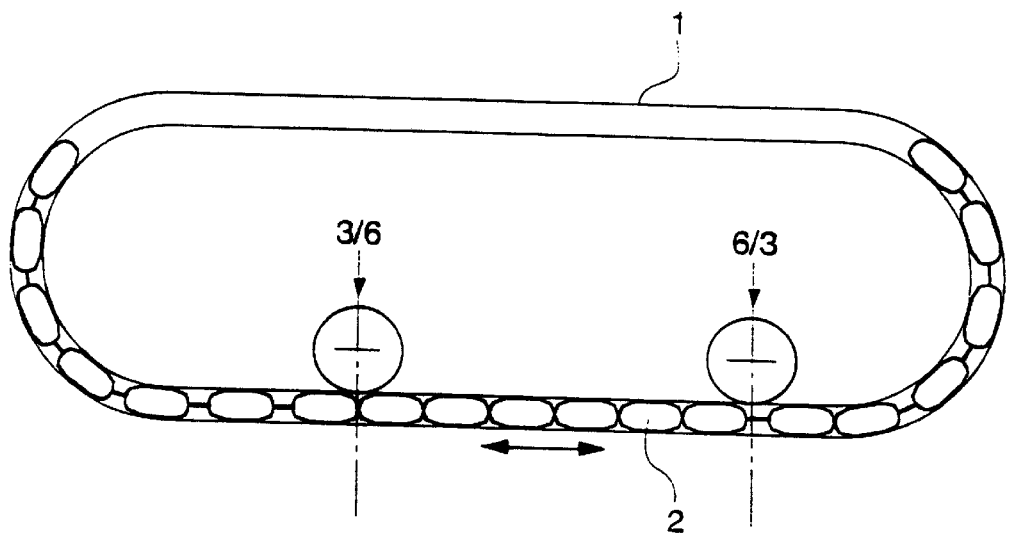

FIG. 6 shows an inventive device with a guide means 1 defining a course which is closed in itself and along which a chain comprising two chain ends and a plurality of linked force transmitting elements 2 is displaceable. The device further comprises two drives 3/6 and 6/3. One of the drives is functionally coupled to the elements 2 as drive 3, i.e. substantially without slippage. The other of the drives serves as a tensioning drive 6. By corresponding choice of the relative speeds of the two drives 3/6 and 6/3, the chain is loaded either by a tractive or a compressive load between the drives and, thus, there is created and maintained either the largest possible or the smallest possible distances between the chain links.

Figure 7:
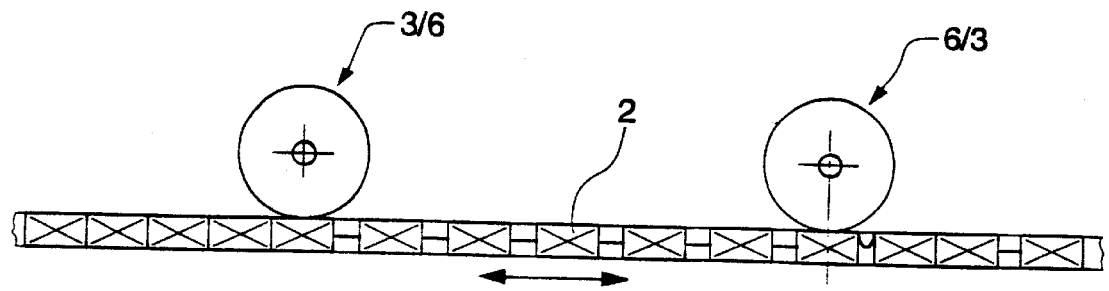

What is shown in FIG. 6 on a course which is closed in itself is obviously also possible with a course which is not closed in itself, as is shown in FIG. 7, wherein a chain of force transmitting elements 2 is loaded between the drives 6/3 and 3/6.

Figure 8:
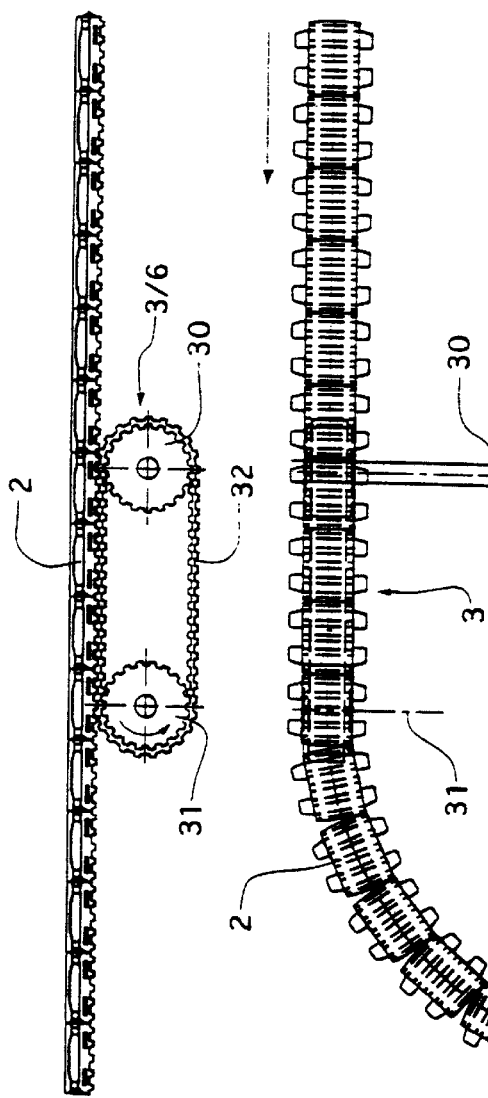
FIGS. 8 and 9 show a further exemplified embodiment of the inventive device in a top view (FIG. 9) and a side view (FIG. 8)
Figure 9:
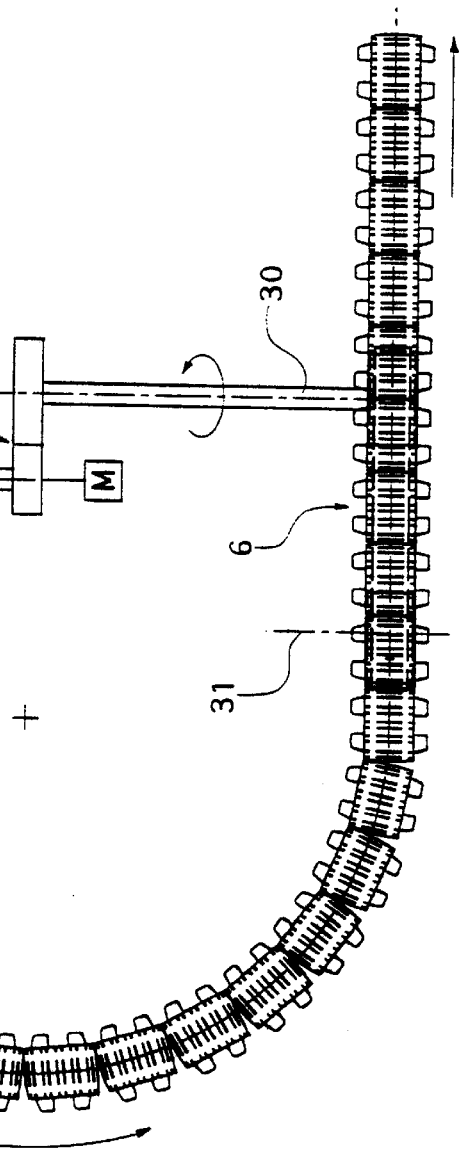

FIGS. 8 and 9 show a further exemplified embodiment of the inventive device. The device is shown in FIG. 9 as a top view and parts of it as a side view in FIG. 8. The force transmitting elements are not connected to each other and are displaced as a line between rails (not shown) by pushing each other. The device comprises two substantially identical drives 3 and 6. Each drive includes toothed belts 32 coupling two toothed wheels 30 and 31 (in FIG. 9 the corresponding axes are shown) and cooperating with corresponding teeth of elements 2. The toothed wheel 30 of the drive 3 shown above in FIG. 9 is functionally coupled, substantially without slippage, to a motor M. The toothed wheel 30 of the tensioning drive shown below in FIG. 9 is connected to the driven shaft of drive 3 via a pair of friction wheels 33. The pair of friction wheels 33 constitutes a friction clutch and a reduction.

In the arrangement as shown, the elements 2 are displaced towards the tensioning drive 6 by drive 3 and are decelerated by tensioning drive 6 such that the line of force transmitting elements between the two drives is loaded by compression and the distances between elements 2 are kept at a minimum.

Figure 10:
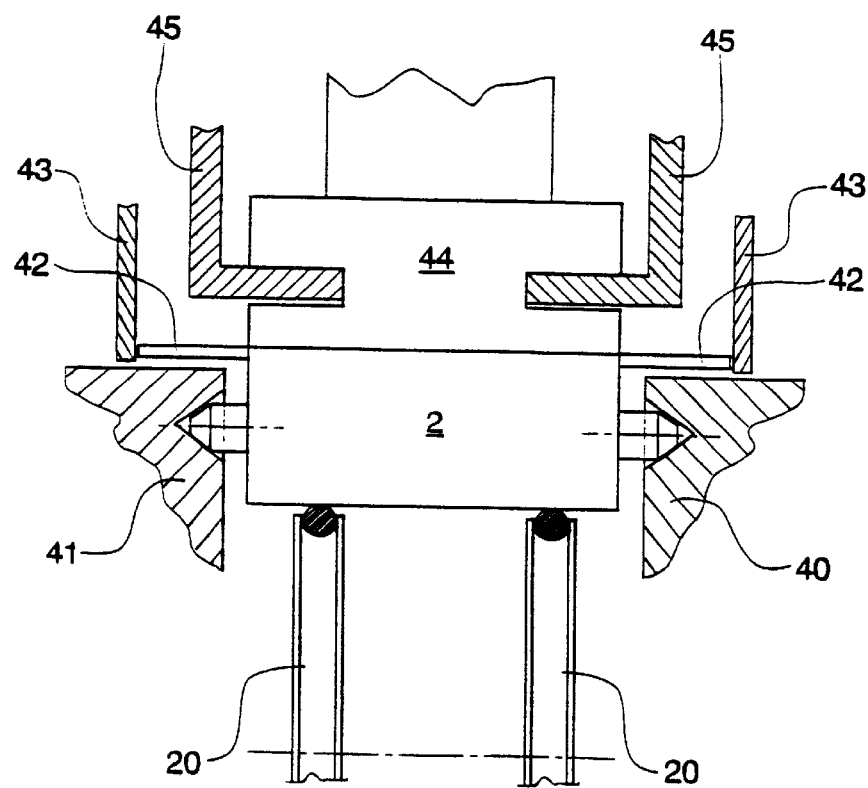
FIG. 10 shows an exemplified arrangement of a force transmitting element and transport element to be coupled to the force transmitting element in section perpendicular to the predetermined course as an illustration of an application of the defined distances between force transmitting elements as realized in the inventive device.

FIG. 10 shows as an illustration of an application of exactly defined distances between force transmitting elements, such an element 2 in section perpendicular to the predetermined course. This predetermined course is defined by two rails 40 and 41 (guide means), along which the element 2 glides or rolls. Below the element 2 there is a pair of tensioning wheels 20 that are functionally coupled with element 2 by friction in the same way as described in connection with FIGS. 1 to 4.

At least the upper area of element 2 is magnetizable e.g. via contacts 42 sliding along rails 43 in the shown region. Above the elements 2 there is a transport element 44 displaceable in a line of similar transport elements along rails 45 and magnetically couplable to the force transmitting element 2.

At a coupling point in which, as shown in FIG. 10, force transmitting elements 2 are coupled to transport elements 44 and are further displaced along the predetermined course as coupled element pairs it is important that the elements 2 have a precisely defined distance between each other if a precise synchronization between transport elements 44 and force transmission elements 2 is to be guaranteed over a length of time.

A compressive load in a line of force transmitting elements 2 may also be used for forming a coupling surface without gaps such that transport elements 44 can be safely coupled to force transmitting elements even if in comparison to the force transmitting elements, the transport elements have a very small extension in the direction of the predetermined course (perpendicular to the paper plane of FIG. 10).

The extension in space of the predetermined course of the inventive force transmission or transport device is freely selectable; it can also be branched and it can be equipped with a plurality of similar or different tensioning drives in different sections.

What is claimed is:

1. A force transmission or transport device comprising a line of force transmitting elements (2), guide means (1) for guiding the force transmitting elements (2) along a predetermined course and at least one drive, wherein the at least one drive displaces force transmitting elements (2) actively in one location of the predetermined course and wherein force transmitting elements (2) displaced by the drive displace further elements by pulling or by pushing, wherein, for tensioning the line of force transmitting elements (2) in a section (5) of the predetermined course, a tensioning drive (6) acting on the elements (2) via a friction clutch is provided on one end of the section (5) and a further drive acting on the elements (2) substantially without slippage is provided on the other end of the section (5), wherein the driving speed (Vs) of the tensioning drive (6) is different from the driving speed (V) of the further drive (3).

2. The force transmission or transport device according to claim 1, wherein the force transmitting elements (2) are connected to each other and the tensioning drive (6) is designed and positioned to tension the line of elements (2) in the section (5) of the predetermined course with either a tractive or a compressive load.

3. The force transmission or transport device according to claim 1, wherein the force transmitting elements (2) are unconnected and the tensioning drive (6) is designed and positioned to tension the line of elements (2) in the section (5) of the predetermined course with a compressive load.

4. The force transmission or transport device according to claim 1, wherein the tensioning drive (6) is functionally coupled to the force transmitting elements (2) by friction.

5. The force transmission or transport device according to claim 4, wherein the tensioning drive (6) comprises a tensioning wheel (7, 20) that is pressed against the force transmitting means (2).

6. The force transmission or transport device according to claim 5, wherein the tensioning wheel (7, 20) comprises an elastically deformable circumferential ring (8, 21).

7. The force transmission or transport device according to claim 1, wherein an element (11, 30) of the tensioning drive (6) is functionally coupled with the force transmitting elements (2) by positive engagement and a friction clutch (12, 23, 33) is provided between two elements of the tensioning drive (6).

8. The force transmission or transport device according to claim 7, wherein the friction clutch comprises a belt drive (12, 23).

9. The force transmission or transport device according to claim 1, wherein a clutch is provided between the tensioning drive (6) and the further drive (3).

10. The force transmission or transport device according to claim 1, wherein the tensioning drive (6) comprises a driven element (22/23) that is driven by the force transmitting elements (2).

11. The force transmission or transport device according to claim 10, wherein the driven element is a driven wheel (22) with an elastically deformable circumferential ring (23), said ring extending as a coupling means between the driven wheel (22) and a tensioning wheel (20).

12. The force transmission or transport device according to claim 10, wherein the driven wheel (22) is arranged to freely rotate on first compression levers (27) and the tensioning wheel (20) is arranged to freely rotate on second compression levers (29), wherein the first compression levers (27) are urged towards the force transmitting elements (2) by first spring means and the second compression levers (29) are fixed to the first compression levers (27) via second spring means (26).

13. The force transmission or transport device according to claim 12, wherein the second spring means urges the second compression levers (29) toward the force transmitting elements (2).

14. The force transmission or transport device according to claim 7, wherein the friction clutch comprises a pair of friction wheels (33).

15. A force transmission or transport device comprising a line of force transmitting elements (2), guide means (1) for guiding the force transmitting elements (2) along a predetermined course and at least one drive, wherein the at least one drive displaces force transmitting elements (2) actively in one location of the predetermined course and wherein force transmitting elements (2) displaced by the drive displace further elements by pulling or by pushing, wherein, for tensioning the line of force transmitting elements (2) in a section (5) of the predetermined course, a tensioning drive (6) acting on the elements (2) via a friction clutch is provided on one end of the section (5) and an intermittent stop (9) acting on the elements (2) substantially without slippage is provided on the other end of the section (5), wherein the driving speed (Vs) of the tensioning drive (6) is different from the speed (V) at the stop (9).

* * * * *

UNITED STATES PATENT AND TRADEMARK OFFICE
CERTIFICATE OF CORRECTION

PATENT NO. : 6,269,942 B1
DATED : August 7, 2001
INVENTOR(S) : Mader et al.

It is certified that error appears in the above-identified patent and that said Letters Patent is hereby corrected as shown below:

Title page,
Item [57], ABSTRACT, line 12, after "built up.", insert -- The tensioning drive (6) is designed and positioned to push the elements (2) toward the further drive (3) or stop (9) for creating a compressive load, and to pull the elements (2) away from the further drive (3) or stop (9) for creating a tractive load. --.

Column 1,
Lines 7-8, delete "redeter-minded" and insert -- predetermined --.

Column 2,
Line 20, after "load).", begin new paragraph and delete "on" and insert -- On --.

Column 4,
Line 8, delete "5".
Line 14, delete "10".

Signed and Sealed this

Nineteenth Day of March, 2002

Attest:

JAMES E. ROGAN
Director of the United States Patent and Trademark Office

Attesting Officer